United States Patent [19]

Nakano et al.

[11] Patent Number: 5,639,488
[45] Date of Patent: Jun. 17, 1997

[54] MOLDING APPARATUS

[75] Inventors: Hironobu Nakano; Masatoshi Nagata; Junichi Shoudai, all of Yokkaichi, Japan

[73] Assignee: Sumitomo Wiring Systems, Ltd., Japan

[21] Appl. No.: 552,286

[22] Filed: Nov. 2, 1995

[30] Foreign Application Priority Data

Nov. 25, 1994 [JP] Japan ................... 6-291532

[51] Int. Cl.$^6$ ................................ B29C 45/40
[52] U.S. Cl. ............... 425/444; 425/436 R; 425/556
[58] Field of Search .............. 425/436 R, 436 RM, 425/444, 556, DIG. 42, DIG. 47, DIG. 54, 309; 249/57, 63, 67, 68, 76, 165, 166, 179

[56] References Cited

U.S. PATENT DOCUMENTS

| | | | |
|---|---|---|---|
| 2,822,578 | 2/1958 | Lobell | 249/67 |
| 3,150,220 | 9/1964 | Howell | 249/83 |
| 3,508,299 | 4/1970 | Ahern | 425/309 |
| 3,577,843 | 5/1971 | Kutik | 249/67 |
| 3,930,778 | 1/1976 | Roncelli | 425/436 R |
| 4,052,033 | 10/1977 | Taylor | 249/67 |
| 4,239,174 | 12/1980 | Muller et al. | 249/67 |
| 4,330,256 | 5/1982 | Reichenbach et al. | 425/436 R |

FOREIGN PATENT DOCUMENTS

| | | | |
|---|---|---|---|
| 8131053 | 8/1983 | Japan | 249/57 |
| 1154093 | 5/1985 | U.S.S.R. | 425/444 |
| 1353632 | 11/1987 | U.S.S.R. | 425/436 R |
| 1523373 | 11/1989 | U.S.S.R. | 425/436 R |
| 1585057 | 8/1990 | U.S.S.R. | 425/436 R |

OTHER PUBLICATIONS

Copy of International Technical Journal M & E published on Apr. 1, 1995 By: Kogyo Chosakai Publishing Co., Ltd.

*Primary Examiner*—Jay H. Woo
*Assistant Examiner*—Minh-Chau T. Pham
*Attorney, Agent, or Firm*—Jordan B. Bierman; Bierman, Muserlian and Lucas LLP

[57] ABSTRACT

There is disclosed a molding apparatus which includes an ejector pin (16) having, at its forward end, an ejecting portion (33) permitted to abut against an end surface of a tubular elastic resin product (28) and gradually flaring out toward a forward end thereof, and an annular recess (9) for receiving an annular edge portion (26), whereby the tubular elastic resin product (28) is released from a cavity (22) without damages to a base portion of the annular edge portion (26).

11 Claims, 14 Drawing Sheets

MOLDING APPARATUS

BACKGROUND OF THE INVENTION

1. Field of the Invention

The present invention relates to a molding apparatus for molding a tubular elastic resin product such as a rubber stopper with a hollow axial interior. More particularly, the invention relates to a molding apparatus including an ejector pin for removing a tubular elastic resin product without damage from a mold.

2. Description of the Background Art

An example of tubular elastic resin products made by a conventional molding apparatus includes a rubber stopper 51 as shown in FIG. 14. The rubber stopper 51 has a hollow axial open interior 55, a uniform-diameter portion 60 to be held on one end of an outer peripheral surface thereof, and annular protrusions 59 having a smoothly curved surface and formed respectively in the middle of and on the other end of the outer peripheral surface thereof. The rubber stopper 51 is used to provide a water-tight seal between a terminal and a cable for an automotive vehicle and the like. The portion 60 of the rubber stopper 51 is held by a crimping portion of the terminal by crimping, with the cable received in the open interior 55, although not shown.

Referring to FIG. 16, the conventional molding apparatus for such a rubber stopper 51 includes a mold 57 having a vertically bored cavity 56 for molding the outer peripheral surface of the rubber stopper 51, and an ejector pin 50 for abutting against the end surface of the portion 60 of the rubber stopper 51 to release the rubber stopper 51 molded in the cavity 56 therefrom in an ejective manner. The ejector pin 50 is positioned above the mold 57 and is held by and suspended from a mold releasing plate 58 permitted to vertically move by a cylinder not shown and the like. The ejector pin 50 is finished into a cylindrical configuration with a uniform diameter throughout its length as shown in FIG. 15.

In the above described molding apparatus, as shown in FIG. 16, the rubber stopper 51 is molded in the cavity 56 and then released therefrom by moving the mold releasing plate 58 downwardly by the cylinder not shown and the like. This causes the lower end of the ejector pin 50 to abut against the upper end surface of the portion 60 of the rubber stopper 51. As the ejector pin 50 further moves downwardly in the cavity 56, the rubber stopper 51 is released in such a manner that the rubber stopper 51 is forced downwardly out of the cavity 56 as shown in FIG. 17.

Unfortunately, the rubber stopper 51 molded by the conventional molding apparatus has the portion 60 of cylindrical configuration and is hence disadvantageous in that the terminal crimped to the portion 60 is easily slipped axially off the portion 60. To overcome the disadvantage, a new rubber stopper 28 has been proposed which has an annular edge portion 26 bulged outwardly from the end of the portion 60 of the rubber stopper 28 as shown in FIG. 18. The rubber stopper 28 is mounted to one end of a cable 30, and a crimping portion 32 of a terminal 29 is crimped to the portion 60 as shown in FIG. 19. This allows the annular edge portion 26 to lock the crimping portion 32, preventing the terminal 29 from being slipped off the rubber stopper 28.

However, when the rubber stopper 28 having the annular edge portion 26 is molded by the mold 57 having an annular edge portion molding portion 54 at the upper end of the cavity 56 and of a recessed annular configuration complementary in shape to the annular edge portion 26 and is then released from the mold 57 by the cylindrical ejector pin 50 as shown in FIG. 20, a crack 53 is produced in the base portion of the annular edge portion 26 as shown in FIGS. 21 and 22.

More specifically, as shown in FIG. 21, when the lower end of the ejector pin 50 abutting against the end surface of the annular edge portion 26 of the rubber stopper 28 is moved downwardly, the periphery of the open interior 55 of the rubber stopper 28 is forced downwardly by the ejector pin 50, with the annular edge portion 26 locked in the annular edge portion molding portion 54. Then a tearing force is strongly exerted on the base portion of annular edge portion 26 to produce the crack 53 in the base portion thereof (FIG. 22).

SUMMARY OF THE INVENTION

A first aspect of the present invention is directed to a molding apparatus for molding a tubular elastic resin product having at its one end an outwardly bulged annular edge portion. According to the present invention, the molding apparatus comprises: a mold having a cavity for molding the tubular elastic resin product; and an ejector pin for forcing the tubular elastic resin product molded in the cavity at the one end thereof outwardly to release the tubular elastic resin product from the mold, the ejector pin including an ejecting portion for pressing an end surface of the tubular elastic resin product at the one end thereof, and a support portion for supporting the ejecting portion at one end thereof, the support portion having an annular recess on an outer peripheral surface adjacent to the ejecting portion for receiving the annular edge portion elastically deformed and curled when the tubular elastic resin product is forced outwardly.

Preferably, according to a second aspect of the present invention, the ejecting portion of the ejector pin gradually flares out toward a forward end thereof.

Preferably, according to a third aspect of the present invention, the ejecting portion has a maximum diameter portion which is rounded off.

According to the molding apparatus of the first aspect of the present invention, when the ejecting portion is caused to abut against the end surface of the tubular elastic resin product for mold release, the annular edge portion is elastically deformed so as to be curled toward the base end of the ejecting portion, and then received in the annular recess. The base portion of the annular edge portion is subjected to no strain. Therefore, the tubular elastic resin product is released from the mold without cracks in the base portion of the annular edge portion.

According to the second aspect of the present invention, the ejecting portion gradually flaring out toward the forward end of the ejector pin allows the annular edge portion to be effectively curled toward the base end of the ejecting portion and received in the annular recess. This effectively prevents cracks in the base portion of the annular edge portion.

According to the third aspect of the present invention, the rounded maximum diameter portion of the ejecting portion insures the prevention of damages to the tubular elastic resin product by the maximum diameter portion.

It is therefore an object of the present invention to provide a molding apparatus which is capable of ejecting a tubular elastic resin product having an outwardly bulged annular edge portion on one end of an outer peripheral surface thereof by an ejector pin to release the tubular elastic resin product from a mold without cracks in a base portion of the annular edge portion.

These and other objects, features, aspects and advantages of the present invention will become more apparent from the following detailed description of the present invention when taken in conjunction with the accompanying drawings.

DESCRIPTION OF THE PREFERRED EMBODIMENTS

A preferred embodiment according to the present invention will now be described with reference to the drawings.

Figure 18:
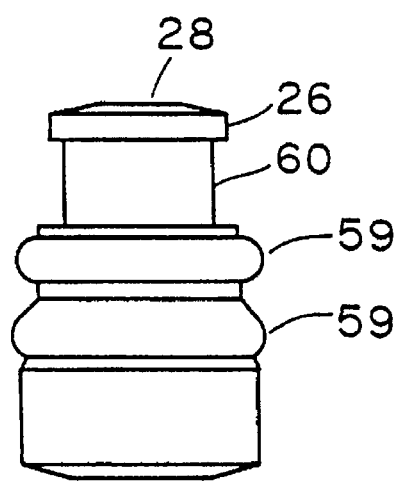
FIG. 18 is a side view of a rubber stopper with an annular edge portion.
Figure 19:
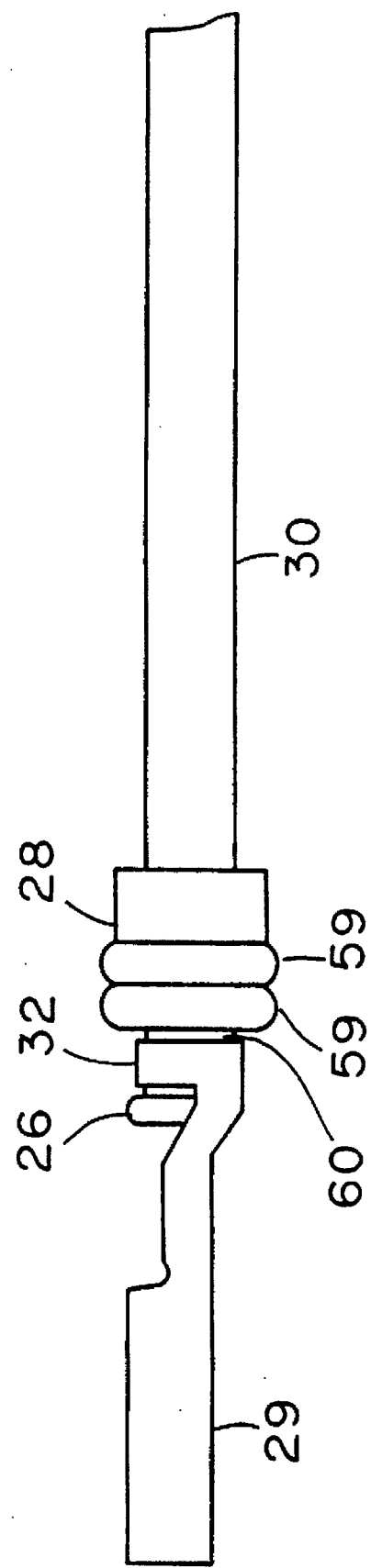
FIG. 19 illustrates the rubber stopper when in use.
Figure 20:
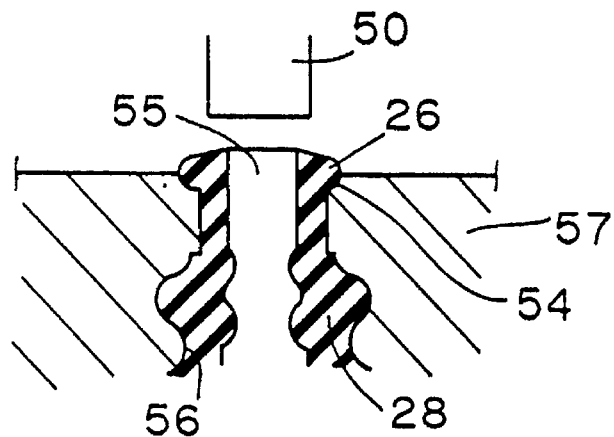
FIG. 20 illustrates the mold releasing operation.
Figure 21:
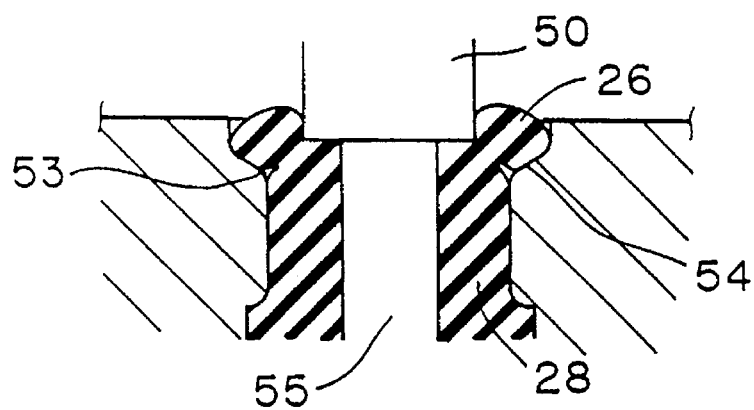
FIGS. 21 and 22 illustrate a problem of the background art.
Figure 22:
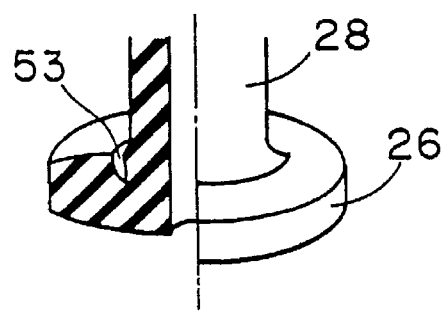

Referring to FIGS. 1 to 4, a molding apparatus according to one preferred embodiment of the present invention comprises a sprue mold 11 mounted to a fixed adapter plate 10, a vertically movable runner mold 12 under the sprue mold 11, a mold 13 under the runner mold 12, a movable backing plate 14 under the mold 13, and a movable adapter plate 15 under the movable backing plate 14. A mold releasing plate 17 having ejector pins 16 extending vertically downwardly is provided in side-by-side relation to the fixed adapter plate 10. The mold 13, the movable backing plate 14, and the movable adapter plate 15 are movable to a position under the mold releasing plate 17. The fixed adapter plate 10 and the sprue mold 11 are formed with an injection nozzle 18 for injecting a molding material such as plasticized rubber. A runner flow path 20 for distributing the molding material injected from the injection nozzle 18 to a plurality of locations is provided between the sprue mold 11 and runner mold 12 and in the runner mold 12 toward which the molding material is injected from the injection nozzle 18. The mold 13 has a plurality of cavities 22 for molding the outer peripheral surface of the rubber stoppers 28 serving as tubular elastic resin products (FIG. 18), and the movable backing plate 14 has a plurality of cores 21 each for providing an axial open interior 55 (to be described later) in the rubber stopper 28. The molding material passing through the injection nozzle 18 and distributed by the runner flow path 20 is injected into the respective cavities 22.

Figure 1:
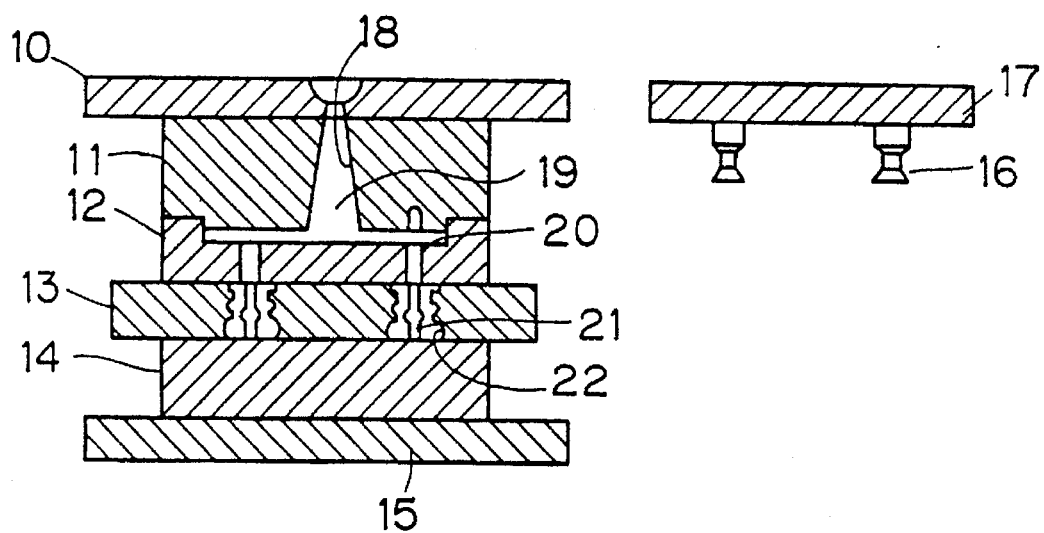
FIGS. 1 to 4 illustrate the operation of a molding apparatus according to the present invention.
Figure 2:
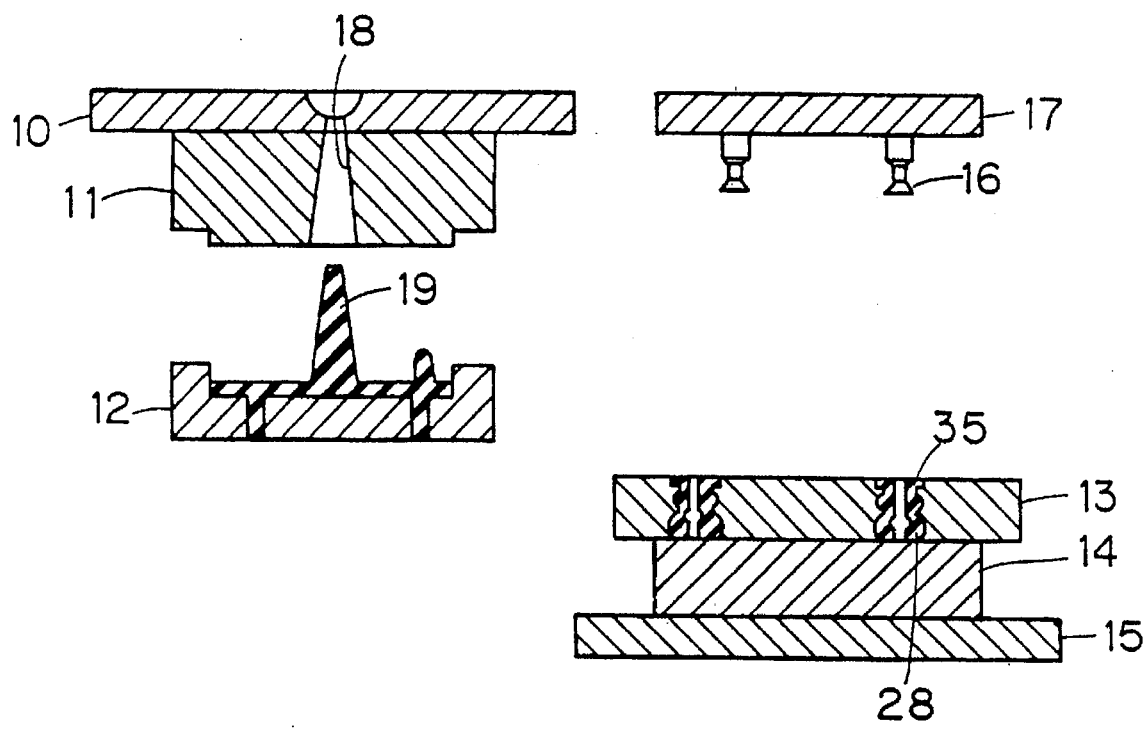

The molding process by the molding apparatus of above stated construction will be discussed below. Upon being injected from the injection nozzle 18 through the runner flow path 20 into the cavities 22, the molding material is heated and vulcanized. Then, as shown in FIG. 2, the mold 13 with the rubber stoppers 28 molded in the cavities 22 is laterally moved together with the movable backing plate 14 and movable adapter plate 15 to the position under the mold releasing plate 17, and the runner mold 12 with a runner 19 on an upper surface thereof moves downwardly.

Figure 3:
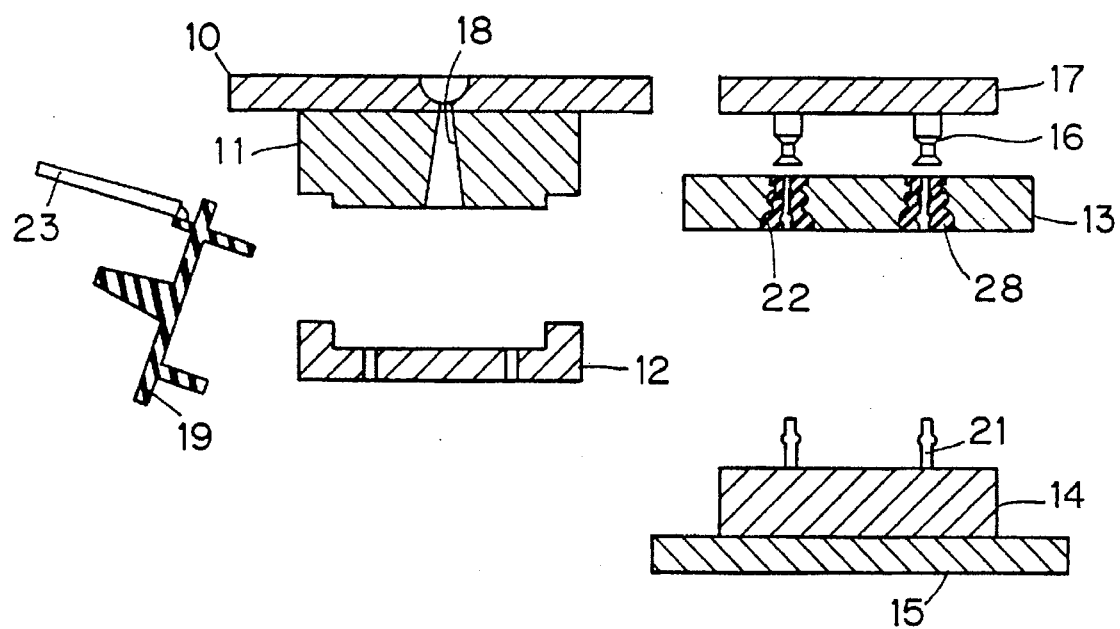

Then, as shown in FIG. 3, the runner 19 is removed from the runner mold 12 by a tool 23. The mold 13 is separated from the movable backing plate 14 to move upwardly, releasing the cores 21 from the rubber stoppers 28.

Figure 4:
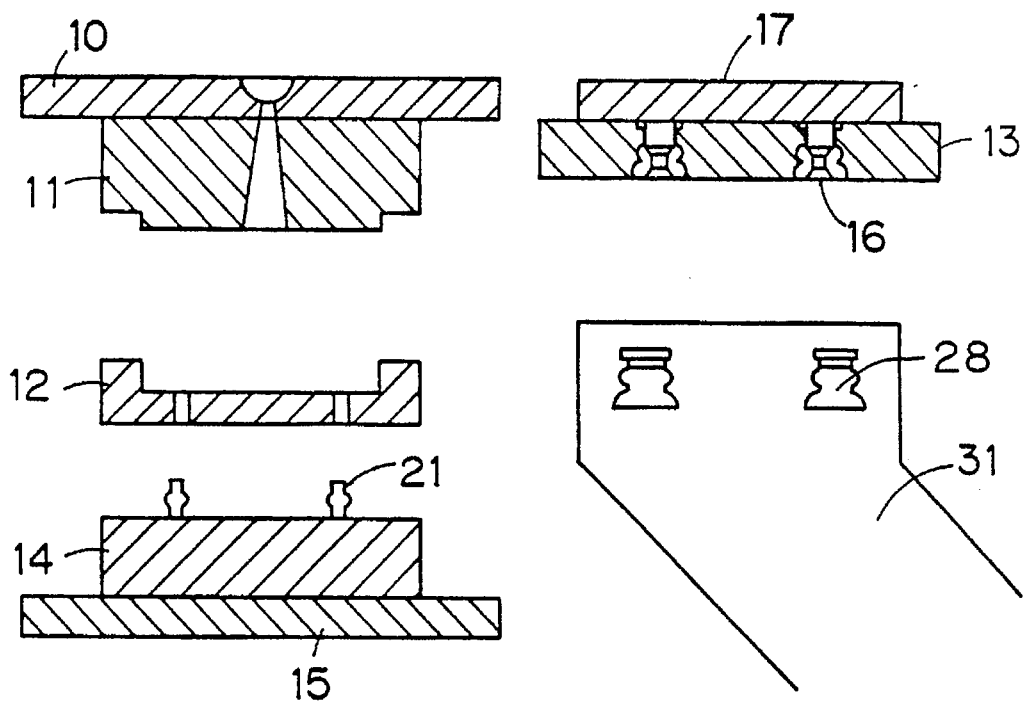

With reference to FIG. 4, the rubber stoppers 28 held in the cavities 22 of the mold 13 are forced downwardly by the ejector pins 16 from above (to be described later in detail), released from the cavities 22, and collected by a product collecting portion 31 located under the cavities 22.

Figure 5:
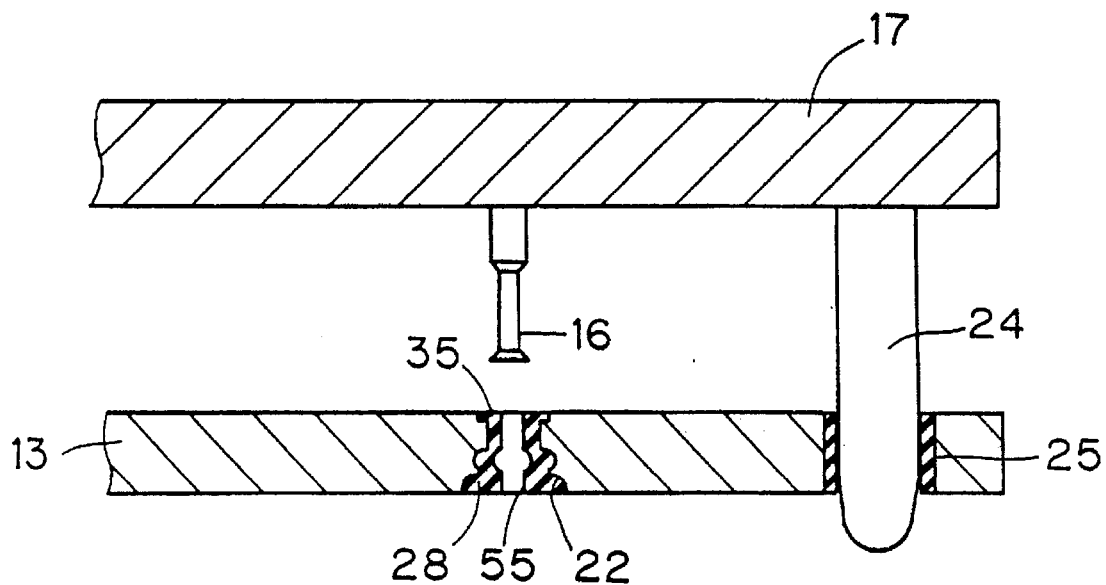
FIG. 5 is a cross-sectional view of the molding apparatus according to the present invention.

The details of the molding apparatus will be described hereinafter. Referring to FIG. 5, the ejector pin 16 on the lower surface of the mold releasing plate 17 and extending perpendicularly thereto is opposed to the cavity 22 in the mold 13. The mold releasing plate 17 and mold 13 are positioned relative to each other by slidably inserting a guide pin 24 perpendicular to and extending from the lower surface of the mold releasing plate 17 into a guide hole 25 defined in the mold 13. In this state, as the mold 13 is moved upwardly toward the mold releasing plate 17 by a hydraulic cylinder not shown and the like, the ejector pin 16 forces the rubber stopper 28 held in the cavity 22 outwardly from above to release the rubber stopper 28 downwardly from the mold 13.

The cavity 22 in the mold 13 is shaped to conform to the outer peripheral surface of the rubber stopper 28. The cavity 22 has, at its upper end, an annular edge portion molding portion 35 of a recessed annular configuration for molding an annular edge portion 26 of the rubber stopper 28.

Figure 6:
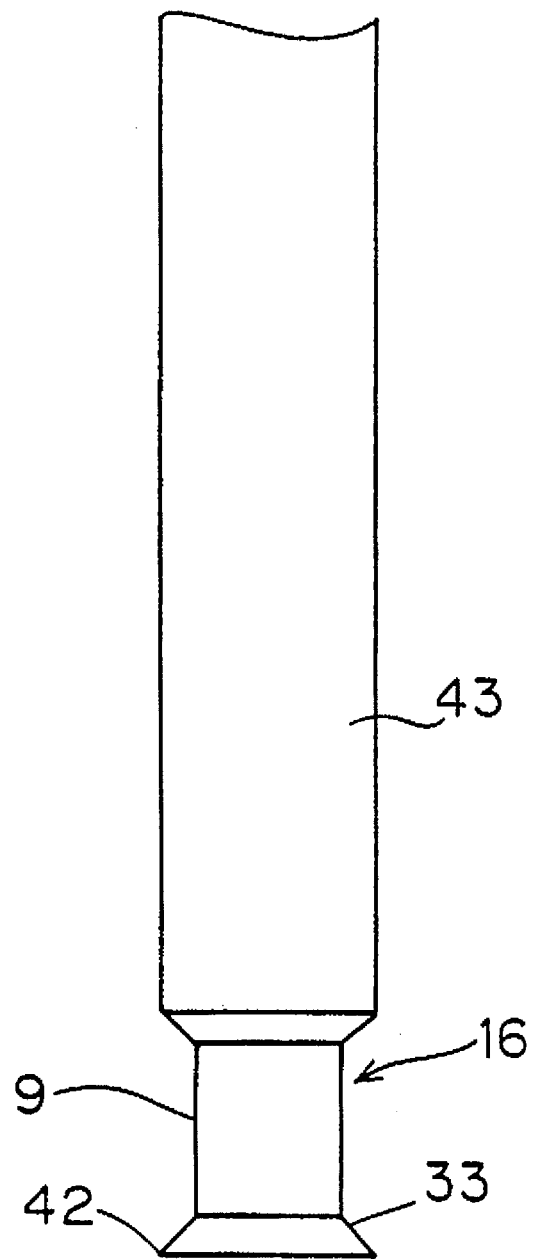
FIG. 6 is a side view of an ejector pin of a preferred embodiment according to the present invention.

As illustrated in FIG. 6, the ejector pin 16 for mold release includes an ejecting portion 33 gradually flaring out toward its forward end, and a supporting portion 43 for supporting the ejecting portion 33 at one end thereof, the supporting portion 43 having an annular recess 9 on an outer peripheral surface adjacent to the ejecting portion 43 for receiving the annular edge portion 26 of the rubber stopper 28 elastically deformed and curled inwardly. The ejecting portion 33 is required to prevent the ejector pin 16, upon abutment against the end surface of the rubber stopper 28, from entering the open interior 55 of the rubber stopper 28, and the ejector pin 16 is required to be insertable into the cavity 22. Therefore, a maximum diameter portion 42 of the ejecting portion 33 is required to have a diameter greater than the diameter of the open interior 55 of the rubber stopper 28 and less than the minimum inner diameter of the cavity 22 (generally equal to the minimum outer diameter of the rubber stopper 28). For example, when the inner diameter of the rubber stopper 28 ranges from 1.2 to 1.8 cm, the minimum outer diameter of the rubber stopper 28 is 3.4 cm, and the outer diameter of the annular edge portion 26 is 4.0 cm, then the maximum diameter of the ejecting portion 33 is preferably about 3.0 cm. Further, when the annular edge portion 26 has a greater bulging size, the annular recess 9 for receiving the annular edge portion 26 is required to be recessed in a greater amount.

Figure 7:
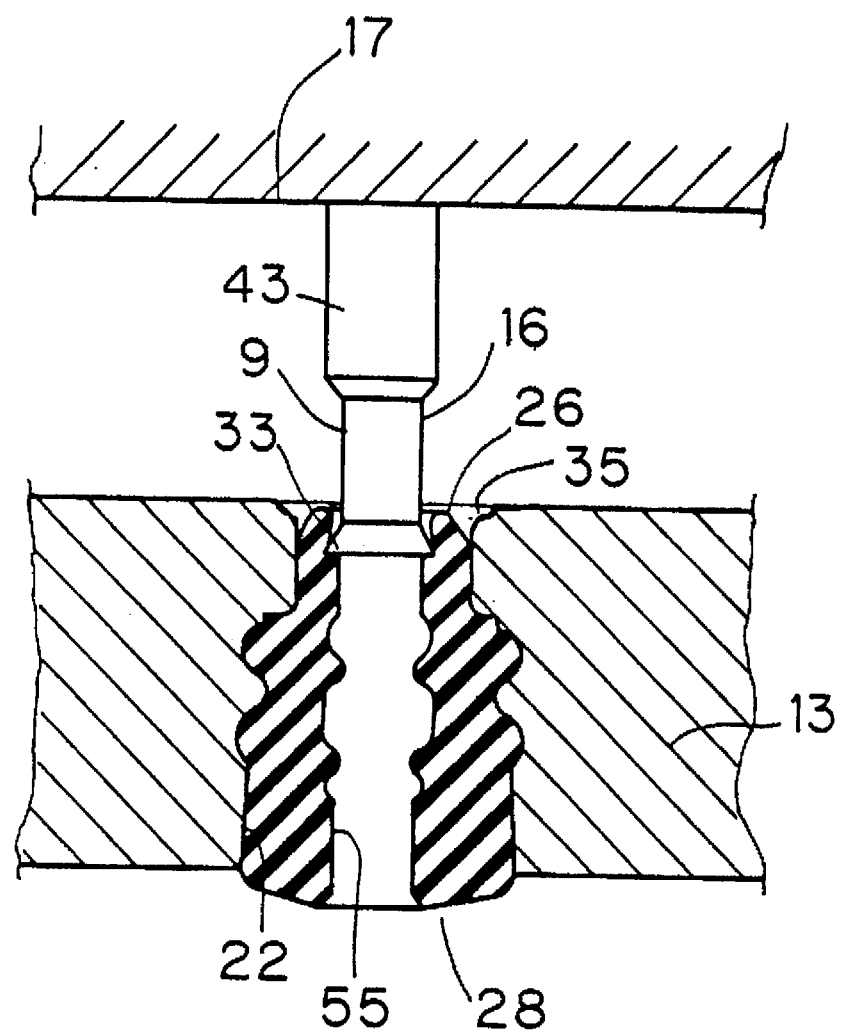
FIGS. 7 and 8 illustrate the molding apparatus.
Figure 8:
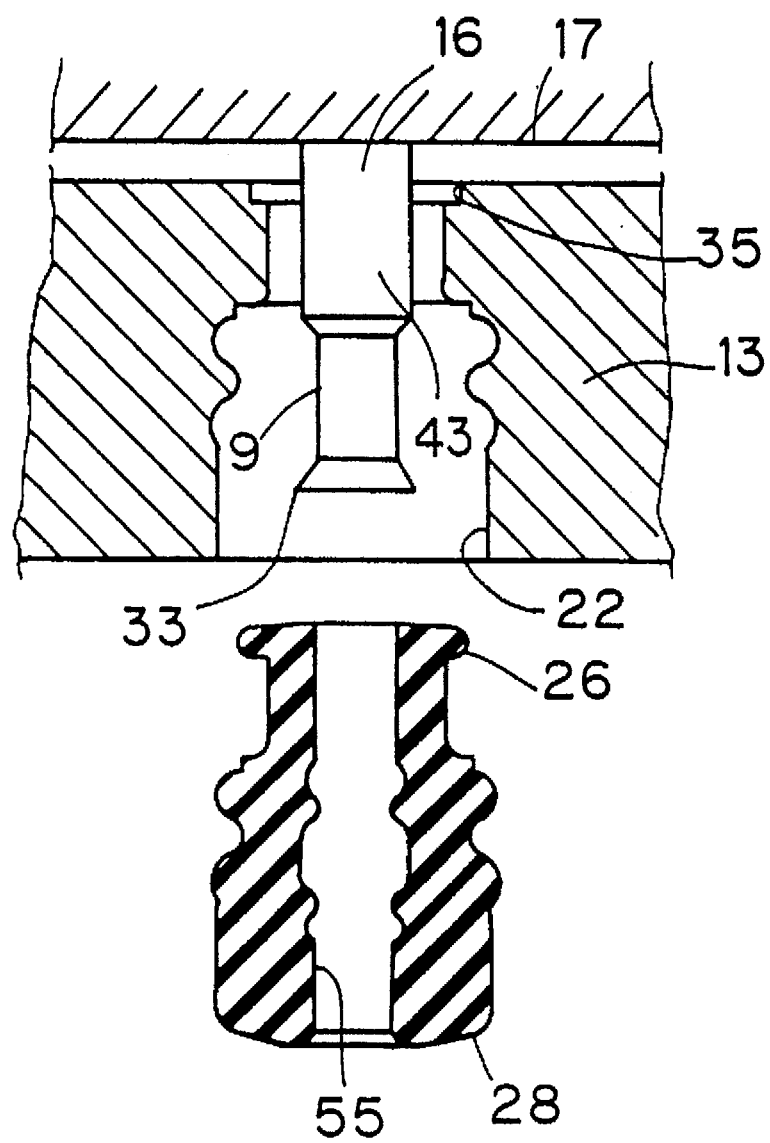

The release of the rubber stopper 28 from the cavity 22 of the mold 13 by the ejector pin 16 is discussed with reference to FIGS. 7 and 8. First, with the ejecting portion 33 abutting against the periphery of the open interior 55 in the upper end surface of the rubber stopper 28, the ejector pin 16 is relatively moved downwardly. Then, with the annular edge portion 26 locked in the annular edge portion molding portion 35 of the cavity 22, the periphery of the open interior 55 of the rubber stopper 28 is pressed downwardly, and the annular edge portion 26 is elastically deformed and received in the annular recess 9 such that the annular edge portion 26 is curled toward the base end of the ejecting portion 33. In this manner, with the annular edge portion 26 received in the annular recess 9, the ejector pin 16 ejects the rubber stopper 28 downwardly from the cavity 22 as shown in FIG. 8. The base portion of the annular edge portion 26 is subjected to no strain and, hence, is not torn off. The rubber stopper 28 may be released without damages.

Figure 9A:
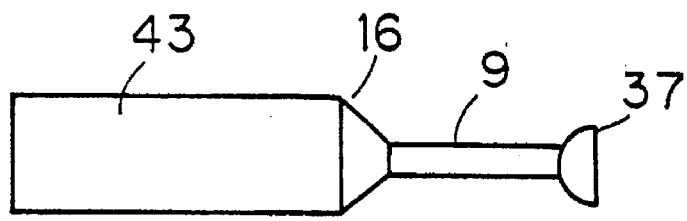
FIGS. 9A to 9E are side views of other preferred embodiments according to the present invention.
Figure 9B:
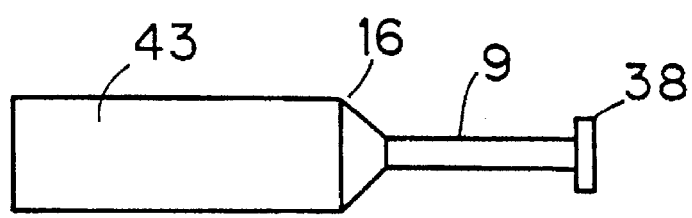
Figure 9C:
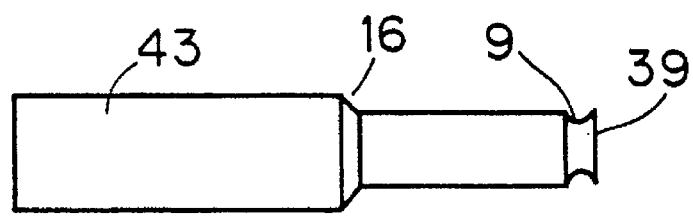
Figure 9D:
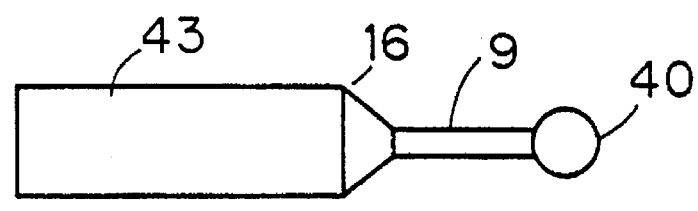
Figure 9E:
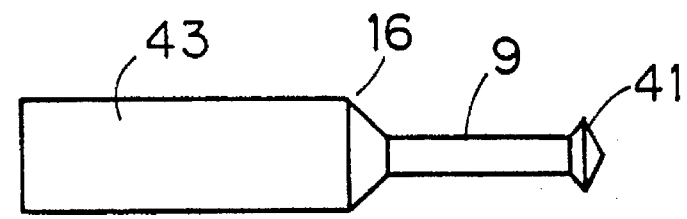

The configuration of the ejector pin 16 is not limited to that of FIG. 6. For example, the ejector pin 16 may have a semi-spherical ejecting portion 37 as shown FIG. 9A, a disc-shaped ejecting portion 38 as shown in FIG. 9B, a forward end 39 with the annular recess 9 recessed in the form of a ring as shown in FIG. 9C, a spherical ejecting portion 40 as shown in FIG. 9D, or an ejecting portion 41 gradually flaring out and then tapered toward the forward end as shown in FIG. 9E.

Figure 10:
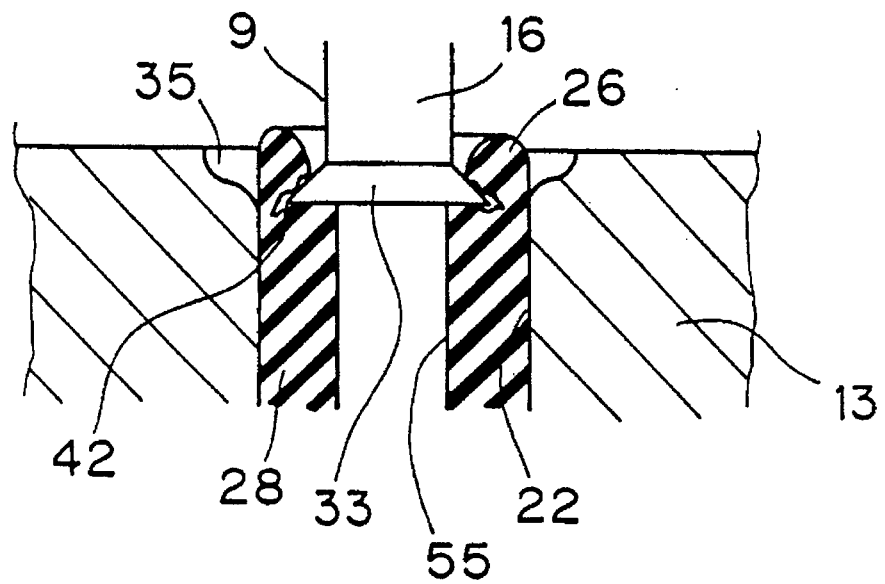
FIGS. 10 and 11 illustrate the operation of the first preferred embodiment.
Figure 11:
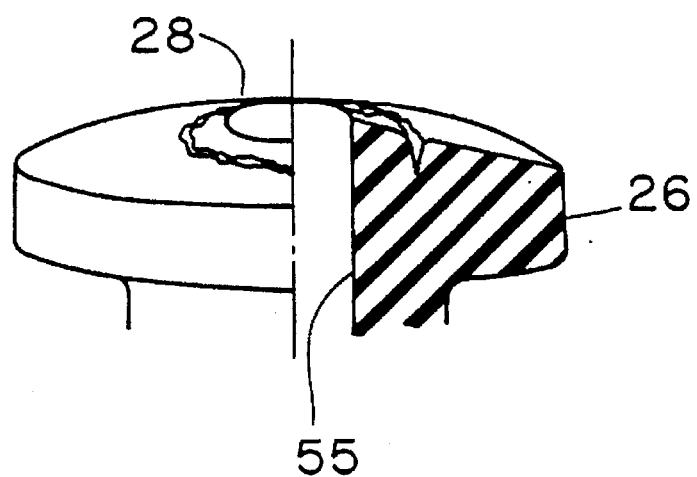
Figure 12:
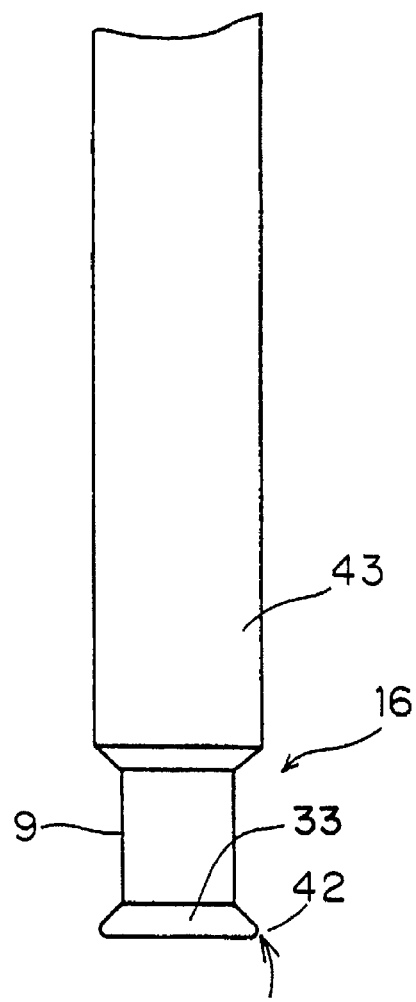
FIG. 12 is a side view of another preferred embodiment according to the present invention.
Figure 13:
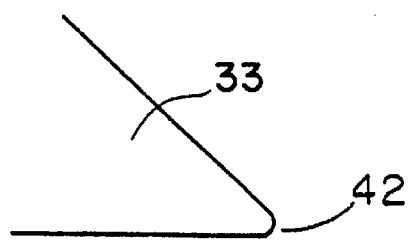
FIG. 13 is an enlarged view of a portion indicated by the arrow of FIG. 12.
Figure 14:
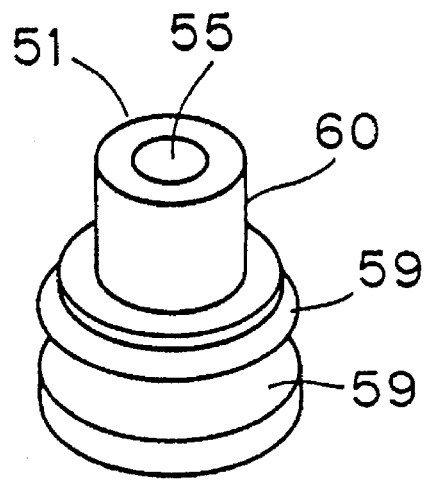
FIG. 14 is a perspective view of a conventional rubber stopper.
Figure 15:
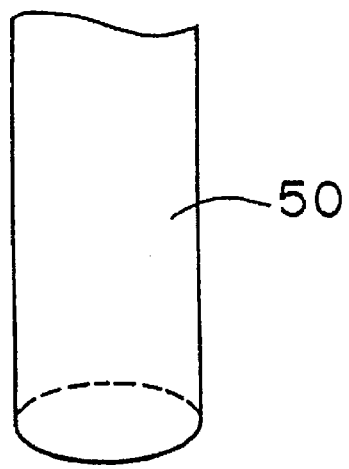
FIG. 15 is a perspective view of a conventional ejector pin.
Figure 16:
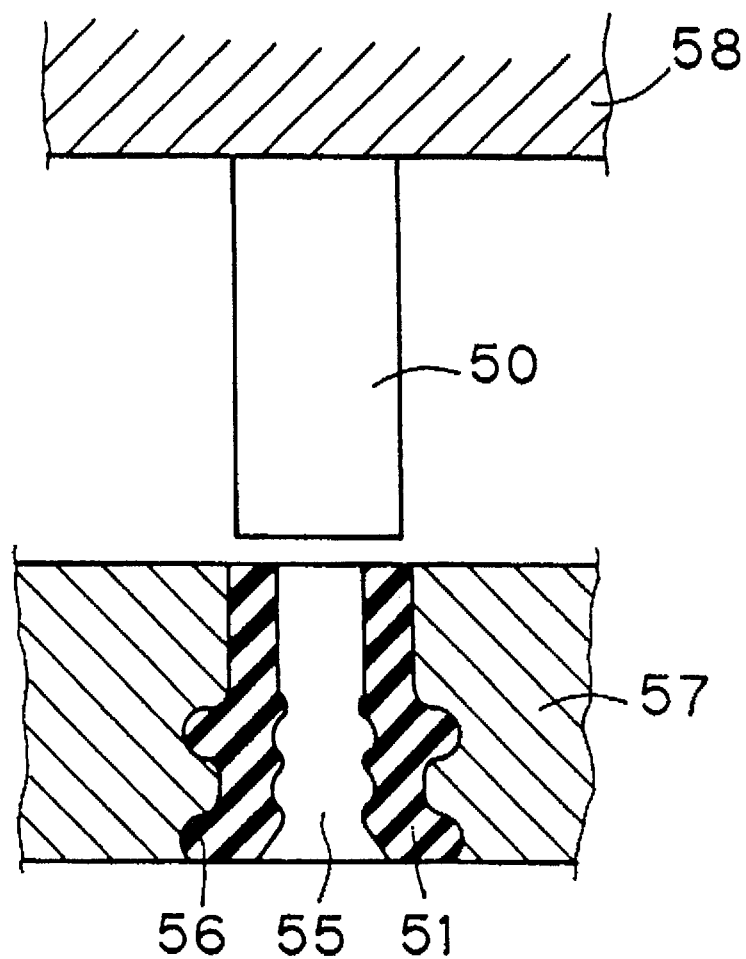
FIGS. 16 and 17 illustrate a conventional mold releasing operation.
Figure 17:
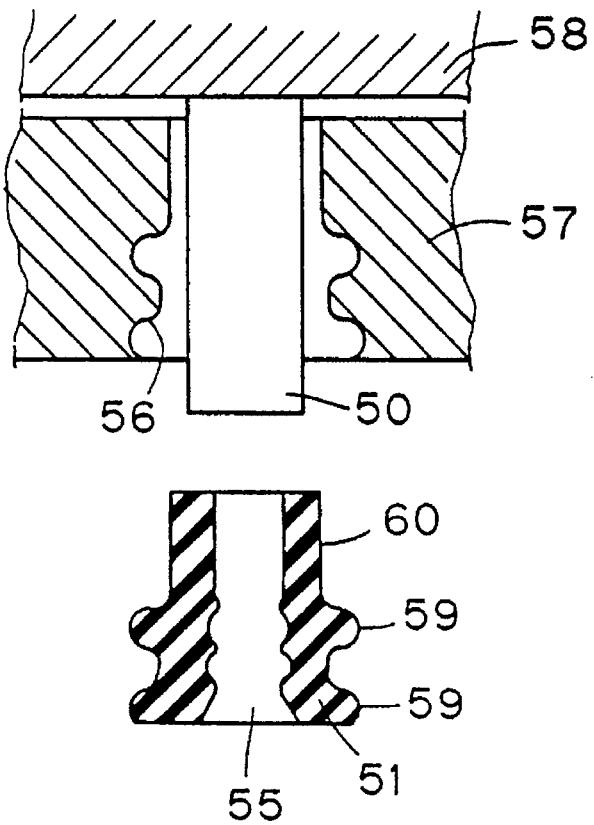

Referring to FIG. 10, the acute maximum diameter portion 42 of the ejecting portion 33 might damage the contact portion with the rubber stopper 28 (FIG. 11). To prevent such a damage, the maximum diameter portion 42 of the ejecting portion 33 may be rounded off as shown in FIGS. 12 and 13.

The above stated molding apparatus is accomplished by only replacing the ejector pin 50 of the conventional molding apparatus with the ejector pin 16 of the present invention and is not required to use a new mold releasing process such as mold release under high pressure or under suction, thereby reducing investment in plant and equipment.

While the invention has been described in detail, the foregoing description is in all aspects illustrative and not restrictive. It is understood that numerous other modifications and variations can be devised without departing from the scope of the invention.

We claim:

1. A molding apparatus for molding a tubular elastic resin product comprising a mold having a cavity for molding said tubular elastic resin product, said cavity having an annular molding portion adapted to form an annular edge portion; and an ejector pin for forcing said tubular elastic resin product molded in said cavity thereof outwardly to release said product from said mold, said ejector pin including an ejecting portion for pressing an end surface of said tubular elastic resin product at said one end thereof, and a support portion for supporting said ejecting portion at one end thereof, said support portion having an annular recess on an outer peripheral surface adjacent said ejecting portion and adapted to receive said annular edge portion as it is elastically deformed and curled when said tubular elastic resin product is forced outwardly.

2. The molding apparatus in accordance with claim 1, further comprising:

a mold releasing plate movable toward and away from an upper surface of said mold in a direction perpendicular to said upper surface, said ejector pin being suspended from said mold releasing plate.

3. The molding apparatus in accordance with claim 2, wherein said mold releasing plate includes a guide pin suspended therefrom, and said mold includes a guide hole formed therein for slidably receiving said guide pin.

4. The molding apparatus in accordance with claim 1, wherein said ejecting portion of said ejector pin gradually flares out toward a forward end thereof.

5. The molding apparatus in accordance with claim 4, wherein said ejecting portion has a maximum diameter portion which is rounded off.

6. The molding apparatus in accordance with claim 4, wherein the maximum diameter of said ejecting portion of said ejector pin is greater than the inner diameter of said tubular elastic resin product.

7. The molding apparatus in accordance with claim 4, wherein said annular recess is recessed sufficiently to receive said annular edge portion.

8. The molding apparatus in accordance with claim 1, wherein said ejecting portion of said ejector pin is of a semi-spherical configuration gradually expanding toward a forward end thereof.

9. The molding apparatus in accordance with claim 1, wherein said ejecting portion of said ejector pin is disc-shaped.

10. The molding apparatus in accordance with claim 1, wherein said ejecting portion of said ejector pin is of a spherical configuration.

11. The molding apparatus in accordance with claim 1, wherein said ejecting portion of said ejector pin gradually flares out and then is tapered toward a forward end thereof.

* * * * *